United States Patent [19]

Mann et al.

[11] Patent Number: 6,111,867
[45] Date of Patent: Aug. 29, 2000

[54] METHOD AND APPARATUS FOR LOAD SHEDDING IN A TDMA PACKET DATA SYSTEM

[75] Inventors: Karl D. Mann, Nepean; Shamim Akbar Rahman, Ottawa, both of Canada; Kamel M. Shaheen, Plano, Tex.

[73] Assignee: Nortel Networks Limited, Montreal, Canada

[21] Appl. No.: 08/989,821

[22] Filed: Dec. 12, 1997

[51] Int. Cl.[7] .............................. H04B 7/212; H04Q 7/20
[52] U.S. Cl. ...................... 370/337; 370/347; 370/442; 455/453; 455/515; 455/528
[58] Field of Search ...................... 370/337–338, 370/328–330, 347–348, 341, 431, 442, 468; 455/453, 515–517, 526, 528

[56] References Cited

U.S. PATENT DOCUMENTS 5,884,165  3/1999  Uchida et al. ......................... 455/515
5,898,681  4/1999  Dutta ..................................... 370/337

*Primary Examiner*—Chi H. Pham
*Assistant Examiner*—Maikhanh Tran
*Attorney, Agent, or Firm*—Foley & Lardner

[57] ABSTRACT

A system implements a method of allocating a mobile communications device, such as a mobile end station, to packet channels, such as packet control channels within a cell. A mobile communications device identifies for access a packet channel by executing an algorithm, such as a hashing algorithm. The mobile communications device then reads a loading message broadcast for that packet channel. If the loading message indicates to the mobile communications device that another packet channel or PCCH should be sought, the mobile communications device tunes to a beacon frequency and reads information for each packet channel or PCCH broadcast at the beacon frequency. The mobile then tunes to a suitable channel. The processing to select a suitable channel is accomplished in the mobile communications device, thereby relieving other system elements, such as the mobile data base station (MDBS) from carrying out that processing and reducing the information traffic on overloaded channels.

12 Claims, 4 Drawing Sheets

FIG. 3

M-ES │ MDBS

301 — M-ES HAS DATA TO SEND, AND GOES TO HASHED PCCH
PCCH (P2) 303
---- a  PCCH BROADCAST INFO: "NEW ACCESSES SHOULD ATTEMPT TO OFF LOAD".
NOTE: ASSUME THAT THE CURRENT PCCH IS AT HIGH LOAD.

305 — M-ES GOES TO BEACON PCCH TO CHECK LOADS ON ALL PCCHs.
BEACON PCCH (P1) 307
---- b  BROADCAST LOAD INFO: "P1 HIGH, P2 HIGH, P3 MEDIUM." 311

309
---- c  NOTE: M-ES SELECTS P3 SINCE IT HAS LOWEST LOAD.

PCCH (P3) — BEGIN FRAME (USER DATA) 313
---- d

PCCH (P3) — CONTINUE FRAME (USER DATA) ...

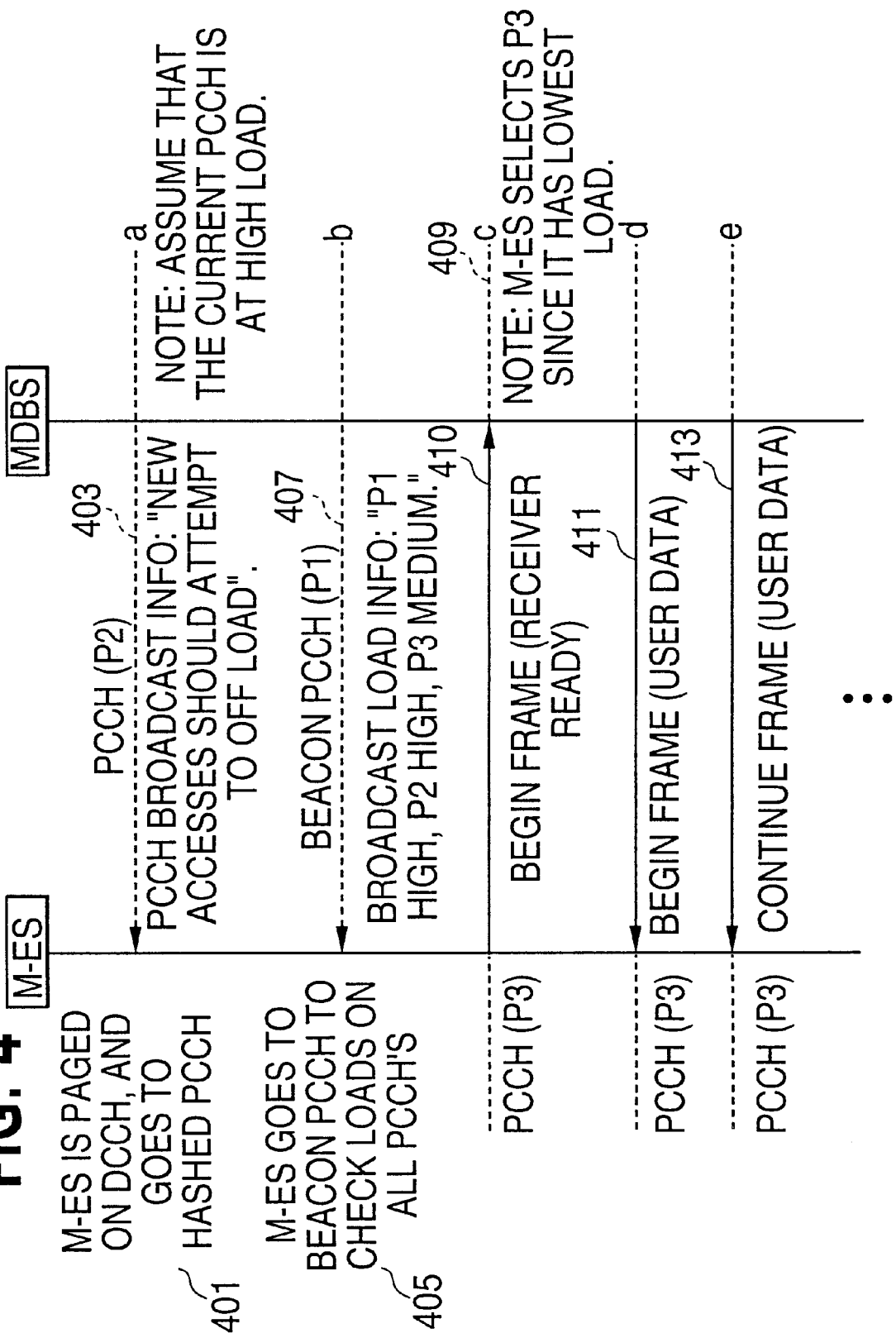

METHOD AND APPARATUS FOR LOAD SHEDDING IN A TDMA PACKET DATA SYSTEM

BACKGROUND OF THE INVENTION

1. Field of the Invention

The invention relates to the field of telecommunications and more particularly to the field of information transfer using packet data switching.

2. Related Art

Circuit switched data is useful for transactions where a relatively large amount of data is transmitted quickly by a relatively small number of users, such as in fax transmissions. The IS-136 standard supports analog and digital circuit switched data. Digital circuit switched data is supported using time division multiple access (TDMA) techniques on digital traffic channels. Analog circuit switched calls use analog voice channels and are essentially transparent to the network.

In contrast, packet switching of data is useful in situations where relatively small amounts of data are transmitted by a relatively large number of users, such as in Internet E-Mail transmissions. The IS-136 standard does not currently support integrated packet switched data transmission.

One approach that has been used as an overlay to IS-136 to support packet data is called Cellular Digital Packet Data (CDPD). CDPD specifies packet data operation that use free analog voice channels to transmit packet data. Efforts are now underway to develop an IS-136 standard to support a TDMA air interface that is compatible with CDPD and will integrate packet and circuit switched voice/data with respect to call delivery, mobility management and authentication.

The use of packet control channels (PCCH) and packet traffic channels (PTCH) has been proposed as one way to implement a packet switched system. In a PCCH/PTCH system, call setup would take place on a PCCH, while packet delivery would take place on a traffic channel (PTCH) assigned from the PCCH. The PCCH/PTCH approach has the disadvantage of idle channel capacity. As previously noted, packet switched data tends to be used when a large number of users have relatively small amounts of data to transmit. The occurrence of bursts of data is characteristic of such situations. Trunking efficiency using PCCH/PTCH is not good for low to moderate offered traffic loads, because capacity is wasted on the PCCH which is only used for call set up signalling.

An alternative approach is dedicated PCCH. Using dedicated PCCH, both control and data traffic occurs on the same channel, thereby avoiding the wasted traffic capacity associated with PCCH/PTCH. There are multiple PCCHs in a cell. A mobile unit or mobile finds its PCCH using a static hashing algorithm based on mobile station identification (MSID). Since the hashing algorithm is static, it is possible for a PCCH to become overloaded. For example, under high load conditions and even under some low load conditions, it is possible for the static hashing algorithm executed in the mobiles to hash too many mobiles to the same PCCH. Overloading can occur, for example, when the hashing algorithm, which is executed in each mobile seeking to communicate, observes a large number of mobiles with the same or similar digits in certain portions of the MSID used by the hashing algorithm. In the overload circumstance, the mobile receives a message from the switch on the selected PCCH to go to another PCCH. A disadvantage with this approach lies in the fact that the message to select another channel must be transmitted on the overloaded PCCH, thus further overloading that channel. It may take several attempts to successfully transmit the necessary information to the mobile from the switch, adding to the overload condition and delaying transmission even longer. Furthermore, the processing for this condition takes place in the switch, which must identify a better channel and notify the mobile to tune to that better channel. As a result, benefits in reduced switch processing associated with locating the scheduling algorithm in the mobiles rather than the switch are lost.

SUMMARY OF THE INVENTION

In view of the disadvantages and limitations of the PCCH/PTCH and dedicated PCCH systems discussed herein, it is an object of the invention to provide a dedicated PCCH system that is more responsive to overloading conditions on PCCH.

It is still another object of the invention to provide a system responds to such overloading conditions without the need for increasing processing loads in the switch.

The above and other objects of the invention are accomplished by a system which implements a method of allocating a mobile communications device to packet control channels within a cell. According to the method, a mobile identifies for access a packet control channel by executing an algorithm, such as a hashing algorithm. The mobile then reads a loading message broadcast for that channel. If the loading message indicates to the mobile that another PCCH should be sought, the mobile tunes to a beacon frequency and reads information for each channel broadcast at the beacon frequency. The mobile then tunes to a suitable channel. According to another aspect of the invention, the loading message can indicate to the mobile the need to seek another channel by transmitting a single flag. The loading message can instead include an indicator that the channel loading is high, medium or low. Another alternative is for the loading message to broadcast a numerical loading indicator, such as a percentage, which the mobile reads and compares to a reference stored therein to determine which PCCH is suitable. A feature of the invention is that the mobiles determines which channel to tune to, based on broadcast messages, thus avoiding the need for the system switch to process the information needed to make a channel determination for each mobile. This approach according to the invention also avoids the need for the system to transmit alternate channel identifications over an already overloaded channel.

BRIEF DESCRIPTION OF THE DRAWINGS

The invention is described herein with reference to the drawings in which:

FIG. 3 shows information flow according to the invention when the mobile is originating a transmission;

FIG. 4 shows information flow according to the invention when the mobile is the terminating station or recipient of the transmission.

DETAILED DESCRIPTION OF THE PREFERRED EMBODIMENTS

Figure 1:
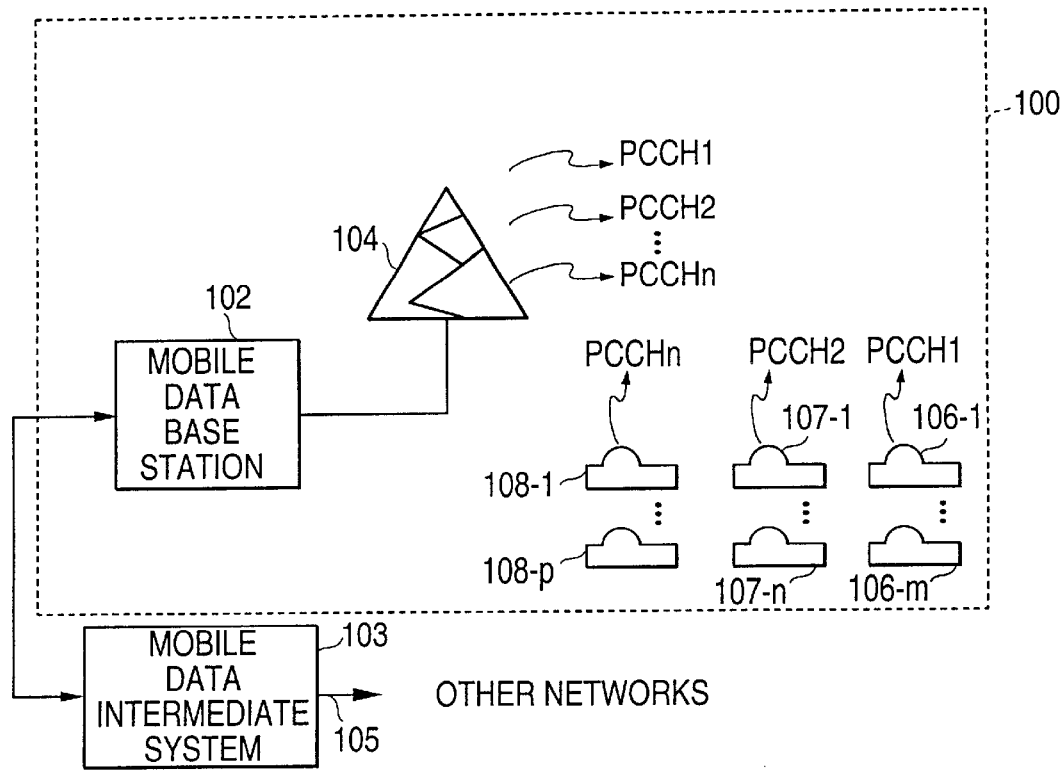
FIG. 1 illustrates an operational environment for a system according to the invention.

FIG. 1 shows an operational environment for a system according to the invention having a dedicated PCCH system in which traffic and control information are transmitted to a mobile on the same channel. In cell 100 there is at least one mobile data base station (MDBS) 102, which communicates with a mobile data intermediate system (MDIS) 103, also referred to as a switch. MDIS 103 provides an interface 105 to other networks. MDBS 102 is connected to transmit tower 104 which transmits a plurality of PCCH channels at different frequencies, PCCH1, PCCH2, . . . PCCHn. In FIG. 1, mobile units, 106-1 through 106-m have assigned themselves to PCCH1, mobile units 107-1 through 107-n have assigned themselves to PCCH2 and mobile units 108-1 through 108-p have assigned themselves to PCCHn. Mobile units are also refereed to herein as mobile end stations (M-ES) or mobiles.

According to the invention, these mobiles assigned themselves to these channels by executing an algorithm programmed into the mobile. One example of such an algorithm is a hashing algorithm. One such hashing algorithm assigns mobiles seeking to communicate in cell 100 as a function of the station ID. For example, the algorithm can operate by testing a predetermined plurality of digits in the station ID and assigning those mobiles within a particular range of the selected digits to a predetermined PCCH. A hashing algorithm is one of any number of methods that can be used to assign mobiles to channels. The invention, however, operates effectively with any assignment algorithm and is not limited to any particular channel assignment algorithm or method.

When a plurality of mobiles assign themselves to the same PCCH, as shown for each PCCH in FIG. 1, time division multiple access (TDMA) techniques can used to arbitrate access to the PCCH. One such TDMA technique is a contention method in which mobiles attempt to access the PCCH as needed. If a collision occurs between mobiles attempting to access the same PCCH at the same time, a back-off protocol is implemented. Other TDMA techniques may also be used in order to assure access to the PCCH by the mobiles as desired by the system designer. The invention is also not limited by a particular TDMA implementation for any PCCH.

Figure 2A:
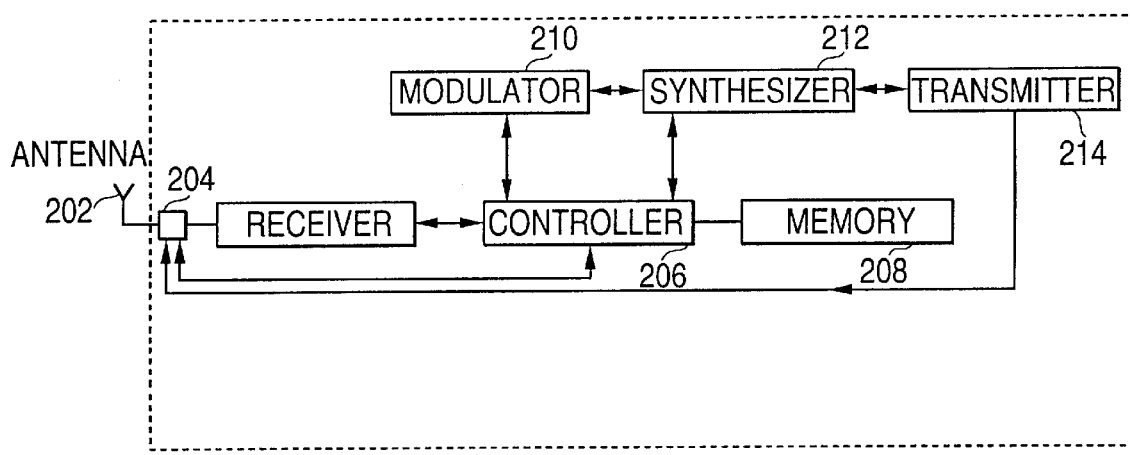
FIG. 2a illustrates a block diagram showing elements of a mobile unit that can be used in a system according to the invention.
Figure 2B:
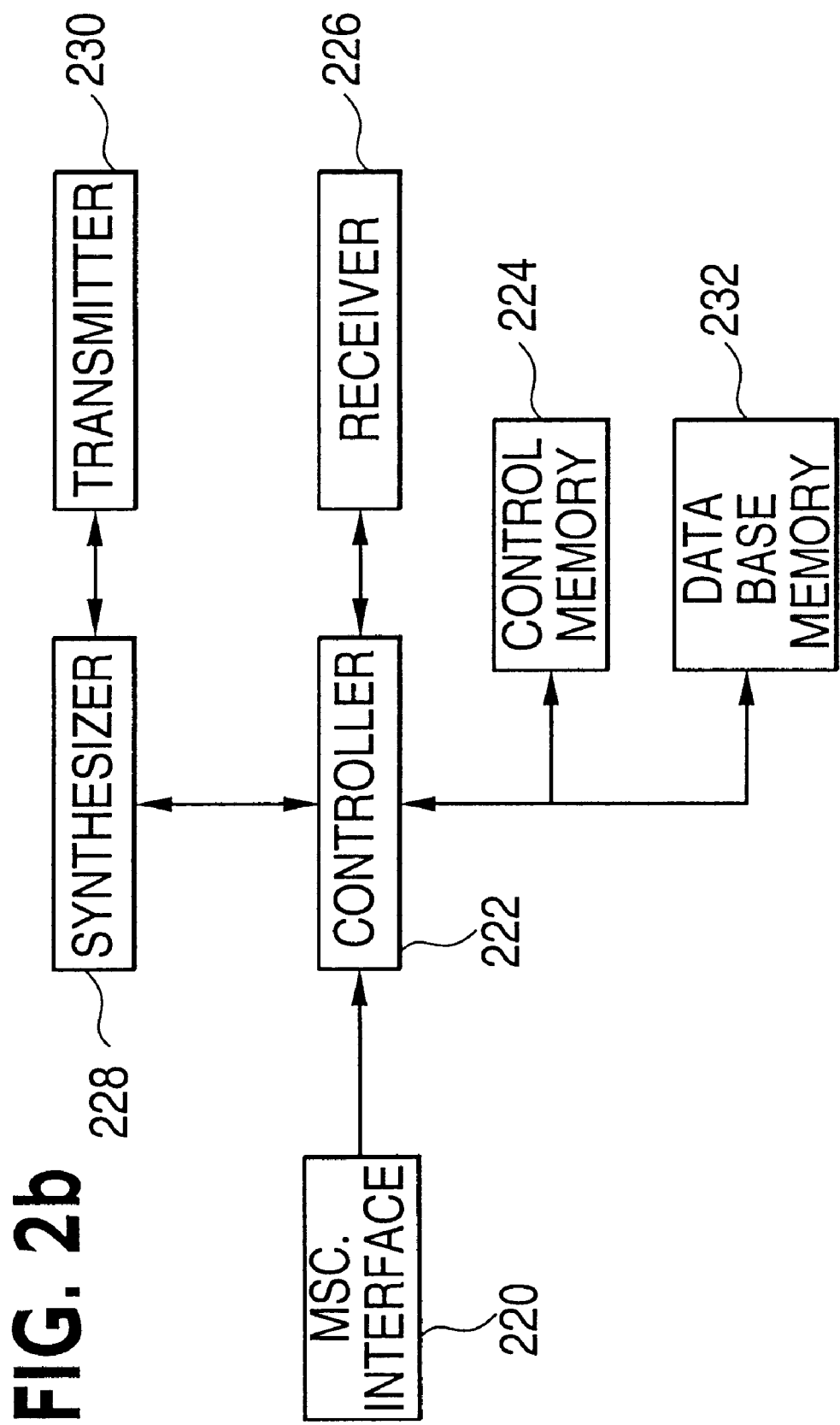
FIG. 2b illustrates a block diagram of a mobile data base station (MDBS) that can be used in a system according to the invention.

FIG. 2a is a block diagram showing the elements of a mobile useful in the system according to the invention. FIG. 2b is a block diagram showing the elements of a mobile data base station useful in a system according to the invention. FIGS. 2a and 2b are illustrative. Details of the hardware and software implementations of the various system elements are not essential to operation of the invention. Those of ordinary skill will be familiar with suitable hardware and software implementations of mobile units, mobile data base stations and transmitters, mobile data intermediate systems and other elements used in cellular type systems to implement the invention. The mobile unit 200 shown in FIG. 2a includes an antenna 202 and a transmit-receive switch 204. In the receive mode, received signals are routed from the antenna to a receiver section, which conditions the received signal for processing by controller 206. The controller 206 may direct the receiver to tune to a particular frequency. Controller 206 operates in accordance with a program stored in memory 208, which may include read only memory (ROM) and random access memory (RAM). The controller 206 typically also includes a processor or other execution unit, and can be used to implement a PCCH selection algorithm, such as a hashing algorithm. The controller 206 may also perform other functions, such as implementing a collision back off algorithm for TDMA access. The mobile may also include a modulator 210 and synthesizer 212 responsive to the controller to generate information to be transmitted by transmitter section 214.

FIG. 2b illustrates the elements of a mobile data base station (MDBS). The MDBS is equipped with an interface 220 to the mobile switching center to provide communication outside the cell. A controller 222 directs operations within the MDBS and operates in accordance with a program in a control memory 224. The controller 222 receives signals conditioned for processing by receiver stage 226 and direct synthesizer 228 to generate signals to be transmitted at the various PCCH frequencies by transmitter 230. One function performed by the controller 222 is to access data base memory 232, which identifies the PCCH frequencies. By counting or otherwise monitoring the number of accesses made to a particular PCCH, the MDBS maintains a record of the loading on each PCCH. The controller 222 transmits this information on each PCCH, for example, as an overhead message. In addition, the controller 222 directs periodic transmission of loading information for all PCCHs on a beacon channel. The synthesizer 228 operates in response to controller 222 to transmit this data, which can be received by the mobile units when loading data is transmitted by transmitter 230.

FIG. 3 illustrates the process according to the invention when a mobile end station (M-ES) has data to send. In this case, the mobile end station executes its PCCH access algorithm, such as a hashing algorithm and tunes to the PCCH selected by the algorithm, in this case P2, as shown at step 301. The mobile data base station (MDBS) broadcasts information concerning the load condition of the selected PCCH, for example as on overhead message, as shown at step 302. FIG. 3 shows that the loading message broadcast on the selected PCCH, P2, indicates that a heavy load condition exists on this channel and that another PCCH should be selected. This message can take any suitable form. For example, the message could be a text message or simply a heavy load flag. The message could also be an indicator of the level of loading on the selected PCCH, such as a heavy, medium or light load code or a numerical code indicating the amount of loading on the selected PCCH. Where the message is a numerical indicator or a code for heavy, medium or light traffic, the mobile end station will decode the message and compare it to a programmed threshold to determine whether to seek access to another PCCH. In any case, when the mobile end station recognizes that new access should be attempted on another PCCH, the mobile end station will tune to a beacon frequency, as shown at step 305. At the beacon frequency, the MDBS broadcasts load information for all PCCHs, as shown at step 306. FIG. 3 shows the information broadcast at the beacon frequency as indicating whether the load on a PCCH is heavy moderate or light. However, as previously noted, other load indication messages can also be used according to the invention. For example, it is within the scope of the invention to transmit messages indicating that access should not be attempted on certain heavily loaded channels or to transmit a numerical loading indicator to the mobile end station.

The mobile end station reads this message and selects another PCCH, for example, the lowest loaded channel, as shown at step 309. It is within the scope of the invention to program the mobile end station to select another PCCH according to any desired criteria. For example, where the mobile end station receives a numerical indicator, the mobile end station compares the numerical indicator to PCCH loading thresholds to select a suitable PCCH. The PCCH loading thresholds can be fixed according to predetermined criteria or can be dynamically adjusted according to load conditions on other available PCCHs. For example, where the mobile recognizes that all available channels are becoming heavily loaded, it can adapt its thresholds to seek access to those channels with more gradually increasing loading conditions, while at lower load conditions of other available channels, such increased loading is not necessary. The mobile end station can also fix certain thresholds so that increased loading will not be attempted on specific channels, such as channels which must remain lightly loaded to provide a clear path for emergency communications. It is significant, that since the processing is performed in the mobile end station, it is not necessary to perform this processing at the MDBS or the mobile date intermediate system (MDIS). The MDBS need only track and broadcast the loading conditions for the PCCHs in the cell, while the mobile end stations perform the channel selection processing.

Once the mobile end station selects a PCCH, user data transmission begins on the selected channel, as shown at step 311, and continues on that channel until complete in accordance with the frame protocol; as shown at step 313.

FIG. 4 illustrates the situation where the mobile end station is the termination unit, or is to receive a data transmission. This method operates in much the same way as that shown in FIG. 3. In this case, at step 401, the mobile end station receives a page and tunes to the PCCH determined by the channel selection algorithm, as previously discussed herein with respect to FIG. 3. Steps 403, 405, 407 and 409 correspond to steps 303, 305, 307 and 309, as previously discussed herein and the same considerations and options apply in this case. After selection of a PCCH, the mobile end station transmits a receiver ready indicator, as shown at step 410. In steps 411 and 413, the mobile end station receives the information on the selected PCCH.

Thus, the system and method according to the invention is applicable whether the mobile unit is in transmit or receive mode. In this way, the simplicity and ease of implementation of dedicated PCCH can be employed, while the disadvantages associated with a fixed channel selection, such as a hashing algorithm, are avoided.

While particular embodiments of the invention have been disclosed and described above, it will be known to those of ordinary skill that the invention can take a variety of forms and that other embodiments of the invention can be implemented within the scope of the appended claims.

What is claimed is:

1. A method of allocating a mobile communication device to packet channels associated with a communications cell, the method comprising the steps of:

(a) identifying for access by said mobile communications device one of said packet channels using an algorithm executed by said mobile communications device;

(b) reading with said mobile communications device a load indicating message for said packet channel;

(c) tuning said mobile communications device to a beacon frequency if said load indicating message so indicates; and (d) reading with said mobile communications device packet channel loading information transmitted at said beacon frequency for other of said packet channels and selecting an alternative one of said packet channels based thereon.

2. A method as recited in claim 1, said algorithm comprising a hashing algorithm.

3. A method as recited in claim 1, step (b) further comprising reading said loading information message as a message directing said mobile communications device to seek another of said packet channels for access.

4. A method as recited in claim 1, wherein step (c) comprises tuning said mobile communications device to another of said packet channels when a load indicated by said load indicating message exceeds a specific level.

5. A method as recited in claim 4, wherein said specific level is fixed at a predetermined level for a specific packet channel.

6. A method as recited in claim 4, wherein said specific level is dynamically determined in said mobile communications device.

7. A system in a mobile communication device for allocating the mobile communication device to packet channels associated with a communications cell, comprising:

means for identifying one of said packet channels for access by said mobile communications device;

means for reading a load indicating message associated with a packet channel;

means for tuning said mobile communications device to a beacon frequency if said load indicating message so indicates; and means for reading packet channel loading information transmitted at said beacon frequency for other of said packet channels and selecting an alternative one of said packet channels based thereon.

8. The system as recited in claim 7, wherein said means for identifying comprises means for executing a hashing algorithm.

9. The system as recited in claim 7, further comprising means for determining that said loading information message directs said mobile communication device to seek another of said packet channels for access.

10. A system as recited in claim 7, wherein said means for tuning provides the function of tuning said mobile communications device to another of said packet channels when a load indicated by said load indicating message exceeds a specific level.

11. A system as recited in claim 10, further comprising means for storing a predetermined level as a specific level of a specific packet channel.

12. A system as recited in claim 10, further comprising means for dynamically determining said specific level.

* * * * *